(12) United States Patent
Blomaard et al.

(10) Patent No.: US 11,559,935 B2
(45) Date of Patent: Jan. 24, 2023

(54) METHOD AND PRINTING SYSTEM FOR PRINTING A THREE-DIMENSIONAL STRUCTURE, IN PARTICULAR AN OPTICAL COMPONENT

(71) Applicant: LUXEXCEL HOLDING B.V., Eindhoven (NL)

(72) Inventors: Ricardo Blomaard, Middelburg (NL); Joris Biskop, Vlissingen (NL)

(73) Assignee: LUXEXCEL HOLDING B.V., Eindhoven (NL)

( * ) Notice: Subject to any disclaimer, the term of this patent is extended or adjusted under 35 U.S.C. 154(b) by 300 days.

(21) Appl. No.: 16/334,141

(22) PCT Filed: Sep. 20, 2017

(86) PCT No.: PCT/EP2017/073831
§ 371 (c)(1),
(2) Date: Mar. 18, 2019

(87) PCT Pub. No.: WO2018/055006
PCT Pub. Date: Mar. 29, 2018

(65) Prior Publication Data
US 2019/0366622 A1    Dec. 5, 2019

(30) Foreign Application Priority Data
Sep. 20, 2016  (EP) .................................. 16189571

(51) Int. Cl.
*B29C 64/112* (2017.01)
*B29D 11/00* (2006.01)
(Continued)

(52) U.S. Cl.
CPC ...... *B29C 64/112* (2017.08); *B29D 11/00442* (2013.01); *B29C 64/209* (2017.08); *B33Y 10/00* (2014.12); *B33Y 30/00* (2014.12)

(58) Field of Classification Search
CPC ................ B29C 64/112; B29C 64/209; B29D 11/00442; B33Y 10/00; B33Y 30/00
See application file for complete search history.

(56) References Cited

U.S. PATENT DOCUMENTS 6,203,140 B1    3/2001  Oyen
2015/0224709 A1*  8/2015  Napadensky ........... B29C 41/02
                                                    264/308
(Continued)

FOREIGN PATENT DOCUMENTS

WO    2016/009426 A1    1/2016

OTHER PUBLICATIONS

International Search Report and Written Opinion for International Application No. PCT/EP2017/073831, dated Dec. 12, 2017.
(Continued)

*Primary Examiner* — Yung-Sheng M Tsui
(74) *Attorney, Agent, or Firm* — The Dobrusin Law Firm, P.C.

(57) ABSTRACT

A method and printing system for printing a three-dimensional structure, in particular an optical component, by depositing droplets of printing ink side by side and one above the other in several consecutive depositing steps by means of a print head. In each depositing step a plurality of droplets is ejected simultaneously by a plurality of ejection nozzles of the print head. The print head is moved relative to the deposited droplets in a moving step performed between at least two consecutive depositing steps in such a manner that the droplets deposited in the same position in the at least two consecutive depositing steps are ejected at least partly from two different ejection nozzles.

14 Claims, 3 Drawing Sheets

(51) Int. Cl.
 *B33Y 10/00* (2015.01)
 *B33Y 30/00* (2015.01)
 *B29C 64/209* (2017.01)

(56) References Cited

U.S. PATENT DOCUMENTS

| | | | |
|---|---|---|---|
| 2015/0352781 A1* | 12/2015 | Hosier | B29C 64/112 |
| | | | 425/150 |
| 2016/0101568 A1* | 4/2016 | Mizes | B29C 64/112 |
| | | | 425/135 |
| 2016/0101573 A1 | 4/2016 | Quere et al. | |
| 2016/0167298 A1* | 6/2016 | Mantell | B29C 64/393 |
| | | | 425/145 |
| 2016/0263824 A1 | 9/2016 | Roscoe | |
| 2016/0332383 A1* | 11/2016 | Sanchez | B29C 64/393 |
| 2016/0342149 A1* | 11/2016 | Napadensky | G06F 30/20 |
| 2019/0084229 A1* | 3/2019 | Günther | B33Y 10/00 |
| 2019/0084239 A1* | 3/2019 | Carlson | B29C 64/112 |

OTHER PUBLICATIONS

Extended European Search Report for EP 16189571.9, dated Mar. 8, 2017.

* cited by examiner

METHOD AND PRINTING SYSTEM FOR PRINTING A THREE-DIMENSIONAL STRUCTURE, IN PARTICULAR AN OPTICAL COMPONENT

BACKGROUND

The present invention relates to a method for printing a three-dimensional structure, in particular an optical component, by depositing droplets of printing ink side by side and one above the other in several consecutive depositing steps by means of a print head, wherein in each depositing step a plurality of droplets is ejected simultaneously by a plurality of ejection nozzles of the print head.

Manufacturing three-dimensional optical structures by inkjet printing, in particular droplet-on-demand (DOD) printing is well known from several prior documents, e.g. EP 2 631 686 A1, EP 2 636 531 A1, EP 2 846 982 A1, EP 2 846 983 A1 and EP 2 846 984 A1.

The print head comprising the plurality of ejection nozzles and is moved relative to a substrate on which the droplets are deposited step by step. The movement of the print head as well as the ejection of droplets from certain ejection nozzles have to be controlled in such a manner that the three-dimensional structure is built up.

Prior art document EP 2 846 982 A1 describes in detail how the print head is controlled and how the movement/ejecting can be realized by using so-called intensity image determining the shape of the three-dimensional structure.

The intensity image comprises a two-dimensional pattern of different color intensities. The pattern consists of different pixels, wherein each pixel represents a certain position in the three-dimensional structure to be printed. In particular, each pixel represents a certain position of a two-dimensional projection of the three-dimensional structure onto a flat base plane. On the one hand, the distribution of the intensity in the intensity image represents the shape of the three-dimensional structure as the intensity in each pixel is a value for the height of the three-dimensional structure at the corresponding position. On the other hand, the height of the later printed real three-dimensional structure in a certain position depends on the number of droplets of printing ink and accordingly to the amount of printing material deposited in this position.

The intensity image is transferred to an inkjet printer. The print head of the inkjet printer processes the intensity image in such a manner that the print head moves in several subsequent steps in such a manner that ejection nozzles of the print head are respectively positioned accordingly to pixels in the intensity image and deposit in parallel certain amounts of printing material in the individual positions in each single step. The three-dimensional structure is thereby built up step by step until the amount of printing material deposited in each position correspond to the color intensity in the pixels of the intensity image. The droplets are deposited side by side and one above the other in order to generate the desired three-dimensional shape. After deposition of the droplets, adjacent deposited droplets merge which each other and are subsequently cured by UV-light.

Practice has shown that there are always some deviations between the different ejection nozzles in one print head as they do not precisely eject the same amount of printing ink. In particular, there is always at least one inaccurately working nozzle ejecting significantly less amount of printing ink with each droplet due to clogging of the nozzle by cured printing ink or by contamination with e.g. foreign particles and impurities. The resulting deviations sum up with every new layer of printing ink (usually there are thousands of layers stacked above each other) to inequalities and non-uniformities in the printed three-dimensional structures. Usually, these inequalities and non-uniformities are so small that no visible and disturbing influences occur. However, when printing three-dimensional structure serving as optical components, like lenses and in particular ophthalmic lenses, even the finest small inequalities and non-uniformities lead to serious optical defects disturbing the optical beam path. In particular, these inequalities and non-uniformities generate unwanted diffractive phenomena. The problem is that the locations of inaccurate working nozzles in the print head are usually not known and additionally change over time due to clogging.

SUMMARY

It is therefore an object of the present invention to provide a method and a printing system for printing three-dimensional structures, in particular optical components, without inequalities and non-uniformities arising from deviations in the ejecting characteristics between different ejection nozzles, so that diffractive effects in the printed three-dimensional structure can securely be avoided.

The object of the present invention is achieved with a method for printing a three-dimensional structure, in particular an optical component, by depositing droplets of printing ink side by side and one above the other in several consecutive depositing steps by means of a print head, wherein in each depositing step a plurality of droplets is ejected simultaneously by a plurality of ejection nozzles of the print head and wherein the print head is moved relative to the deposited droplets in a moving step performed between at least two consecutive depositing steps in such a manner that the droplets deposited in the same position in the at least two consecutive depositing steps are ejected at least partly from two different ejection nozzles.

It is herewith advantageously possible to ensure that all droplets deposited in one single position or pixel of the three-dimensional structure do not solely originate from one single ejection nozzle because if this ejection nozzle works inaccurately, the above mentioned unwanted inequalities and non-uniformities occur. In contrast, each position or pixel in the printed three-dimensional structure receives droplets from more than one ejection nozzle according to the present invention, so that potential deviations resulting from few inaccurate working ejection nozzles are compensated for and averaged out, even if the location of inaccurately working nozzles changes due to clogging and declogging. The underlying idea is that in case the print head comprises a plurality of accurate ejection nozzles and e.g. one inaccurate ejection nozzle, there are no inequalities and non-uniformities in the printed three-dimensional structure, at all, if the e.g. one inaccurate ejection nozzle deposits a more or less constant number of droplets in almost each position or pixel of the three-dimensional structure. With other words: It must only be ensured that the e.g. inaccurately working ejection nozzle does not deposit all or most droplets in one single location or pixel of the three-dimensional structure but that the droplets of inaccurately working ejection nozzle are spread over an area of the three-dimensional structure being as large as possible during the whole printing process. Consequently, the method according to the present invention substantially increases printing accuracy and provides printing of three-dimensional structures which can serve as optical components, like lenses and in particular ophthalmic lenses, due to their improved quality.

The printing ink comprises preferably transparent or trans-lucent printing ink. Preferably, the printing ink comprises an UV curable liquid monomer becoming a polymer if being cured. Preferably, the droplets are deposited onto a substrate. The substrate can be a part of the printed structure or a support plate for supporting the deposited droplets only during the printing process. Movement of the print head relative to the deposited droplets is preferably obtained by actively driving the print head, while the substrate on which the droplets are deposited preferably stands still, or by moving the substrate on which the droplets are deposited, while the print head preferably stands still. It is also conceivable that both the print head as well as the substrate are moved actively. However, the wording "moving the print head relative to the deposited droplets" does not necessarily means in the sense of the present invention that the print head is actually moved because alternatively the substrate on which the droplets are deposited can e.g. solely be moved to obtain the relative movement between the print head and the deposited droplets. This can be done also in any of the following preferred embodiments. The printing data are provided to the printer be means of an intensity image. The intensity image preferably comprises a two-dimensional pattern of different grey or colour intensities. The pattern consists of different pixels, wherein each pixel represents a certain position in the three-dimensional structure to be printed. In particular, each pixel represents a certain position of a two-dimensional projection of the three-dimensional structure onto a flat base plane. The distribution of the intensity in the intensity image represents the shape of the three-dimensional structure to be printed as the intensity in each pixel is a value for the height of the three-dimensional structure at the corresponding position. The height of the printed three-dimensional structure in a certain position depends on the number/size of droplets of printing ink and accordingly to the amount of printing material deposited in this position. The print head deposits printing ink in dependency of the intensity image, so that a three-dimensional structure is printed having the shape of the software based-virtual design given by the intensity image.

According to a preferred embodiment of the present inventions, the print head is moved relative to the deposited droplets according to a predefined moving scheme. Preferably, the moving scheme is being defined at the beginning of the actual printing process, prior to the first relative movement of the print head and/or the first deposition of droplets. In this way, it is advantageously possible to choose the moving scheme such that defects caused by malfunctioning ejection nozzles are distributed across the three-dimensional structure such that in particular optically visible defects are avoided. In particular, a moving scheme is chosen such that diffractive phenomena and aberration effects are minimized or entirely avoided. To this end, it is necessary to choose a moving scheme that ensures an ideally uniform distribution of defects. More precisely, let a z-axis be defined by the direction of flight of the deposited droplets and an x-y-plane be the plane perpendicular to this z-axis below the first printed layer. Then the projection of the location of all defects of the printed three-dimensional structure into the x-y-plane preferably ideally yields a uniform distribution of points. Through a most uniform distribution, aberration effects are advantageously minimized. By distributing the defects caused by malfunctioning ejection nozzles as uniformly as possible over the three-dimensional structure, aberration effects caused by clusters of defects or alignments of defects are avoided or at least reduced.

In a preferred embodiment of the present invention, the predefined moving scheme is determined prior to printing depending on the geometry of the three-dimensional structure to be printed and depending on the dimensions of the print head. Preferably, the predefined moving scheme takes into account the ration of the width of the print head, i.e. the number of ejection nozzles available and the width of the three-dimensional structure to be printed. In particular, the predefined moving scheme depends on the number of redundant ejection nozzles, i.e. the difference between the width of the print head and the width of the three-dimensional structure to be printed, preferably in pixels. The number of redundant ejection nozzles usually differs from layer to layer. In particular, when printing a convex lens, the number of redundant nozzles increases with each layer. Preferably, the change of redundant ejection nozzles with layer number is taken into account in the definition of the predefined moving scheme.

In a preferred embodiment, the predefined moving scheme is determined prior to printing depending on the accuracy required of the three-dimensional structure to be printed. In particular, accuracy comprises the difference between intended and printed geometry as well as the difference between intended and printed optical properties. In particular, the predefined moving scheme is defined such that the printed structure satisfies the required accuracy.

According to a preferred embodiment, predefining the moving scheme comprises choosing a compensation set of compensating nozzles and choosing a step sequence of moving distances X and moving directions $\varphi$ by which the print head is moved relative to the deposited droplets during a sequence of moving steps. In particular, the moving scheme comprises a set of moving distances and moving directions $((X_1, \varphi_1), (X_2, \varphi_2), \ldots )$ for each moving step. The moving distance X specifies the distance by which the print head is moved relative to the deposited droplets during each moving step. The moving distance may be specified in pixels or in multiples of the distance D between two adjacent ejection nozzles. The moving direction $\varphi$ specifies the direction in the x-y-plane by which the print head is moved relative to the deposited droplets during each moving step. For example, the moving direction may be defined as the polar angle as measured from one corner of the print head.

In a preferred embodiment, the number of compensating nozzles used in a depositing step is chosen depending on the width of the layer to be printed in the depositing step. Preferably, the number of compensating nozzles is equal or smaller than the difference between the width of the print head and the width of the layer to be printed, both specified in pixels, i.e. in multiples of the distance D between two adjacent nozzles. The compensating nozzles are thus not strictly necessary to print the current layer. They can be used to replace malfunctioning nozzles. In particular, the compensating nozzles can be moved in the active printing region in a moving step in order to deposit droplets of printing ink on the three-dimensional structure to be printed.

According to a preferred embodiment of the present invention, the number of compensating nozzles in the compensation set is chosen depending on the number of layers to be printed.

Preferably, the number of compensating nozzles is chosen such that a most uniform distribution of defects is achieved. The number of compensating nozzles is preferably larger the more layers have to be printed in order to provide a maximal compensation space and thus a distribution that is as uniform as possible.

In a preferred embodiment of the present invention, the number of compensating nozzles differs for at least two depositing steps. In particular, the number of compensating nozzles is adjusted according to the layer to be printed in the current depositing step. If e.g. a subsequent layer has a smaller width than a previous layer, the number of compensating nozzles used in the printing of the subsequent layer may be decreased as compared to the number of nozzles used in the printing of the previous layer. In particular in printing convex structures, e.g. convex optical lenses, the compensation space can thus be increased over the printing process and printing accuracy increased. In particular, the accuracy in a region of small width may be maximized by using only a section of the print head with properly working ejection nozzles.

According to a preferred embodiment of the present invention, the step sequence is chosen such that each of the compensating nozzles deposits droplets of printing ink at each position at most once, i.e. during at most one depositing step. Here, position refers to the projection of the location of the deposited droplet into the x-y-plane. In this way, an accumulation of errors in one position is advantageously avoided. Still, this may lead to unwanted aberration effects. E.g. assuming a single malfunctioning nozzle, by moving the print head by a single nozzle in each moving step, a defect is translated across the structure leaving a line of defects when projected into the x-y-plane. Multiple such lines cause unwanted aberration effects. Therefore, in an alternative preferred embodiment, the step sequence is chosen such that each of the compensating nozzles deposits droplets of printing ink at each position at most once in a fixed interval. Here, the interval refers to a number of layers or depositing steps.

According to a preferred embodiment of the present invention, a step sub-sequence is defined for each layer such that every position occurs only once in the step sequence comprising all step sub-sequences and all steps in the step sequence are randomly shuffled using a random generator. Defining the step sub-sequence comprises predefining each possible step location for each layer, e.g. the first layer has 10 possible step locations, the second layer has 11 possible step locations, the third layer has 12 possible step locations etc. Combining all step sub-sequences yields a set of possible locations that can be used during the printing process. Preferably, every location is unique and does not repeat. From this the step sequence is obtained through a random shuffling of the set of possible locations obtained from combining all step sub-sequences. Preferably, the random shuffling is carried out through a random generator that randomly shuffles each step. In a preferred embodiment, the step sequence randomly generated in this way satisfies a certain set of constraints. The constraints comprise e.g. a minimal step size and a maximum randomization position for the first few layers.

According to a preferred embodiment of the present invention, the moving distance X differs during at least two moving steps. In this way, a regular pattern of defects, as e.g. the line described above, is advantageously avoided. Preferably, the moving distance X differs during at least two consecutive moving steps between which a depositing step is carried out.

In a preferred embodiment of the present invention, the moving direction φ differs during at least two moving steps. Preferably, the moving direction φ differs during at least two consecutive moving steps between which a depositing step is carried out.

According to a preferred embodiment of the present invention, the print head is moved relative to the deposited droplets during at least one moving step for a moving distance X being smaller than a nozzle distance D between two adjacent nozzles during the moving step. E.g. the moving distance X is half the nozzle distance D. Through this microstepping, an accumulation of defects is advantageously reduced.

Preferably, the print head is randomly moved relative to the deposited droplets in the moving step. It is herewith advantageously possible that droplets ejected by the inaccurately working ejection nozzle(s) are almost evenly distributed over a least a section of or the entire three-dimensional structure, as in each depositing step the print head is moved randomly, and therefore averaged out due to stochastical effects. A particular advantage is that the location of the inaccurately working ejection nozzle(s) in the print head is of no importance and therefore has not to be known when performing the inventive method. To make this approach work, the horizontal extension of the print head is preferably substantially greater than the horizontal extension of the three-dimensional structure to be printed, so that even if the print head is moved randomly, there is always an overlap between ejection nozzles and three-dimensional structure to be printed. Moving the print head randomly can be achieved by providing a controller of the print head with a random generator or by providing the controller with a (e.g. predefined and pre-stored) moving scheme which is based on randomly generated parameters initially provided by a random generator at some previous moment, e.g. during designing or manufacturing of the printer.

According to preferred embodiment of the present invention, the print head is moved relative to the deposited droplets during the moving step for a moving distance X being smaller than a nozzle distance D between two adjacent nozzles during the moving step. It is herewith advantageously possible that the inventive method does not only work in a given pixel matrix depending on the distances between adjacent nozzles but also with intermediate sizes and higher resolution. The method is performed in such a manner that in a subsequent depositing step printing ink from more than one ejection nozzle is deposited in the location of a formerly deposited droplet. In this way, the negative influence of a single or few inaccurately working ejection nozzles on the quality of the whole three-dimensional structure can be further reduced. Preferably, the print head is moved relative to the deposited droplets during the moving step in such a manner that the moving distance X is less or equal than one half of the nozzle distance D and preferably less or equal than one quarter of the nozzle distance D.

Furthermore, it is conceivable that the print head is moved relative to the deposited droplets during the moving step for a moving distance X and wherein the moving distance X is modified after each moving step. The moving distance X can e.g. be randomly modified within a predefined interval after each moving and/or depositing step.

According to another preferred embodiment of the present invention, a moving direction φ of the relative movement between the print head and the deposited droplets is changed between two subsequent moving steps between whom at least one depositing step is performed. The moving direction φ can be changed about any angle between 0 and 360 degrees between two sequencing moving steps. It is e.g. conceivable to turn the moving direction φ about 180 degrees, so that the print head is moved in opposite directions in two sequencing moving steps. Preferably, the moving direction φ is modified after each moving step. The moving direction φ can e.g. be randomly modified after each moving and/or depositing step. In each case, the moving direction φ preferably remains parallel to the substrate and/or perpendicular to the ejecting/flying direction of the droplets.

If the print is randomly moved relative to the deposited droplets according to a predefined moving scheme, wherein the moving scheme is initially generated using a random generator, the predefined moving scheme preferably determines moving distance X and/or moving direction φ for each individual moving step.

As known from the prior art, the deposited droplets are at least partly cured after each step of depositing droplets. The printing ink of the deposited droplets are either fully cured after each depositing step or only partly cured. In the second case, a final curing step is performed after finishing the three-dimensional structure.

According to another preferred embodiment of the present invention, the movement of the print head relative to the deposited droplets in the moving step is realized in that the print head and/or the substrate vibrates. It is conceivable that the print head and/or the system continuously vibrates (or oscillates) during moving and depositing steps, so that the relative movement is automatically obtained between subsequent depositing steps. In this way, also a random and not predefined movement of the print head between two subsequent depositing steps can be achieved because the exact moving distance between to subsequent depositing steps cannot be predicted due to the high frequency of the vibrations. The vibration of the print head and/or the substrate is stimulated by means of a vibration generator. Preferably, the vibration generator stimulates the print head and/or the substrates continuously, so that the moving steps and the depositing steps completely, mainly or partially overlap in time with each other. The print head and/or the substrate are stimulated by a vibration generator to high frequency vibrations, preferably with a frequency of more than 1 megahertz, particularly preferably more than 100 megahertz and most particularly preferably more than 1 gigahertz.

Alternatively, the print head and/or the substrate vibrates only during moving steps. However, preferably the print head and/or the substrate vibrates during moving, depositing and/or curing steps.

Preferably, stimulating the print head and/or the substrate to high frequency vibrations means that the print head and/or the substrate periodically and translationally oscillates in at least one longitudinal oscillating axis. Particularly preferably, the print head and/or the substrate is stimulated to high frequency vibrations along two longitudinal oscillating axis perpendicular to each other. The one or two longitudinal axis are arranged parallel to a main plane of the substrate.

In an alternative embodiment of the present invention, the print head and/or substrate is stimulated to high frequency vibrations additionally (to the vibrations along the one or two longitudinal axis parallel to the main plane) or solely around a rotational axis perpendicular to the main plane of the substrate. That means a rotational oscillation of the print head and/or the substrate is stimulated. The rotational axis can e.g. be located in the center or at the border of the substrate, the print head or the three-dimensional structure to be printed.

The object of the present invention is also achieved with a printing system for printing a three-dimensional structure, in particular an optical component, by performing the inventive method, wherein the printing system comprises a print head for depositing droplets of printing ink side by side and one above the other in several consecutive depositing steps, wherein the print head is movable relative to the deposited droplets in a moving step performed between at least two consecutive depositing steps and wherein the print head comprises a plurality of ejection nozzles for ejecting a plurality of droplets simultaneously, wherein the printing system is configured in such a manner that the print head is moved in the moving step in such a manner that the droplets deposited in the same position in the at least two consecutive depositing steps are ejected at least partly from two different ejection nozzles.

Analogously to the inventive method, the printing system according to the present invention advantageously provides a substantially increased printing accuracy and therefore provides printing of three-dimensional structures which can serve as optical components, like lenses and in particular ophthalmic lenses, due to their improved quality. The printing system comprises in particular a print head and a controller for controlling movement of the print head relative to the deposited droplets and/or a substrate on which the droplets are deposited. The controller can be implemented into the print head or realized as a separate unit. Again, movement of the print head relative to the deposited droplets is preferably obtained by actively driving the print head, while the substrate on which the droplets are deposited preferably stands still, or by moving the substrate on which the droplets are deposited, while the print head preferably stands still. It is also conceivable that both the print head as well as the substrate are moved actively. However, the wording "moving the print head relative to the deposited droplets" does not necessarily means in the sense of the present invention that the print head is actually moved because alternatively the substrate on which the droplets are deposited can e.g. solely be moved to obtain the relative movement between the print head and the deposited droplets. The printing system preferably comprises at least one drive unit for actively moving the print head and/or the substrate, wherein the drive unit is controlled by the controller. Furthermore, the printing head comprises in particular a random generator for randomly moving the printing head relative to the deposited droplets in the moving step. Alternatively, the printing system and in particular the controller comprises a storage for storing a predefined moving scheme which is based on randomly generated parameters initially provided by a random generator at some previous moment, e.g. during designing or manufacturing of the printer.

Preferably, the printing system is configured in such a manner that the print head is moved relative to the deposited droplets for a moving distance X during the moving step and wherein the moving distance X differs for at least two moving steps.

Preferably, the printing system is configured in such a manner that a moving direction φ of the relative movement between the print head and the deposited droplets differs for at least two moving steps.

Preferably, the printing system is configured in such a manner that the print head is moved relative to the deposited droplets for a moving distance X during the moving step and wherein the moving distance X is modified after each moving step.

Preferably, the printing system is configured in such a manner that a moving direction φ of the relative movement between the print head and the deposited droplets is changed between two subsequent moving steps between whom at least one depositing step is performed.

According to a preferred embodiment of the present invention, the printing system comprises a vibration generator for stimulating the print head and/or the substrate to high frequency vibrations to obtain relative movement between the print head and the deposited droplets in the moving step. It is conceivable that the print head and/or the system continuously vibrates (or oscillates), so that the relative movement is automatically obtained between subsequent depositing steps.

The vibration generator is configured such that the print head and/or the substrate translationally oscillates along one longitudinal axis parallel to the main plane of the substrate or along two longitudinal axes respectively parallel to the main plane and perpendicular to each other. Furthermore, the vibration generator is configured such that the print head and/or substrate is stimulated to a rotational oscillation around a rotational axis perpendicular to the main plane. The rotational axis can e.g. be located in the center or at the border of the substrate, the print head or the three-dimensional structure to be printed.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

DETAILED DESCRIPTION

Figure 1:
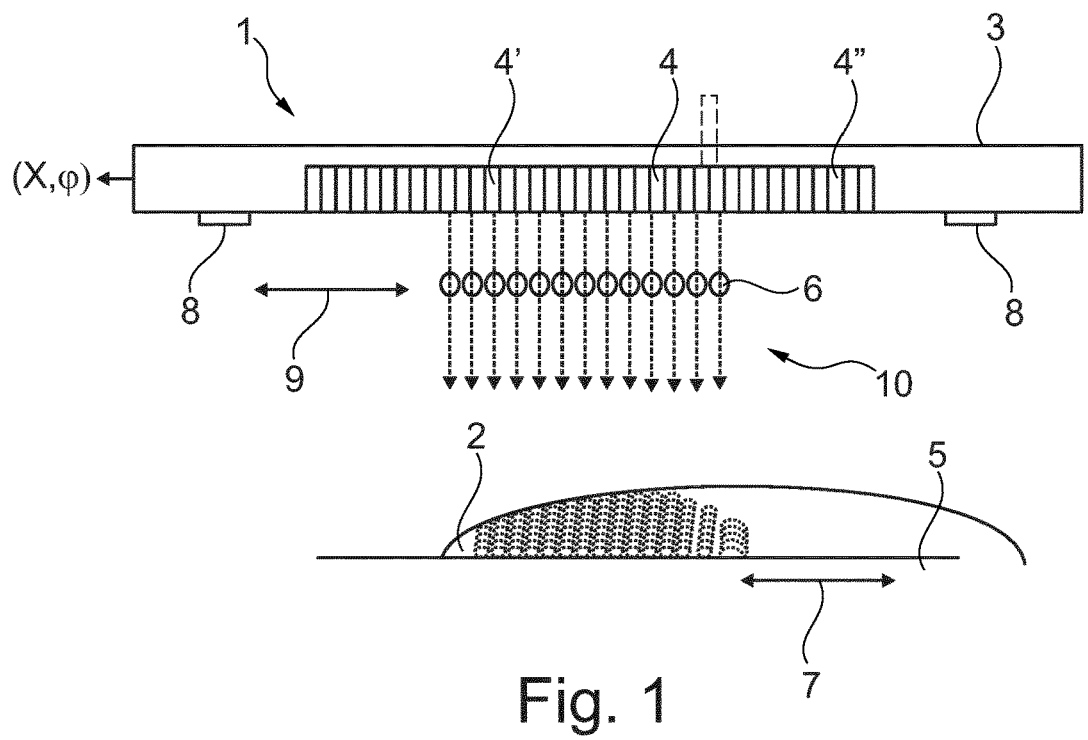
FIG. 1 illustrates schematically a printing system and a method for printing a three-dimensional structure, in particular an optical component, by depositing droplets of printing ink side by side and one above the other in several consecutive depositing steps by means of a print head according to an exemplary embodiment of the present invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described of illustrated herein.

In FIG. 1, a method and a printing system 1 for printing a three-dimensional structure 2 are illustrated. In the present example, the three-dimensional structure 2 comprises an optical component and in particular an ophthalmic lens.

The printing system 1 comprises a print head 3 equipped with a plurality of ejection nozzles 4. The ejection nozzles 4 are arranged in parallel on the lower side of the print head 3. Each ejection nozzle 4 is in fluid connection with a reservoir of printing ink (not shown) and comprises piezoelectric crystals to eject a droplet 6 of printing ink from the print head towards a substrate 5. The printing system 1 can therefore also referred to as DOD (droplets-on-demand) inkjet printer. In each depositing step 10, a volley of several droplets 6 are ejected in parallel and simultaneously towards the substrate 5, so that a layer of deposited droplets 6 arranged side by side onto the substrate 5 is generated. With each following depositing step 10, a further layer of deposited droplets 6 are provided onto the former layer of deposited droplets 6.

After deposition of the droplets 6, adjacent deposited droplets 6 merge at least partially which each other (the deposited droplets 6 are therefore illustrated only schematically by dashed lines) and are subsequently cured in a curing step 11 by UV-light emitted by LED's (light emitting diodes) 8 of the print head 3. The printing ink comprises a transparent or translucent printing ink, preferably an UV curable liquid monomer becoming a polymer if being cured. The depositing steps 10 and the curing steps 11 are repeated subsequently until a desired three-dimensional structure 2 is built up.

In order to deposit droplets 6 in certain positions onto the substrate 5, the ejection nozzle 4 are individually controllable by a controller (not shown) of the printing system 1. The horizontal extension of the print head 1 is substantially greater than the horizontal extension of the three-dimensional structure 2 to be printed, so that a movement of the print head 3 relative to the substrate 2 is not necessary to build up the three-dimensional structure 2 in the present example. The print head 3 typically comprises 1.000 to 5.000 ejection nozzles 4 arranged in parallel. The print head 3 and the substrate 5 are movable relative to each other. In the present example, movement of the print head 4 relative to the substrate 5 is obtained either by actively driving the print head 4 or by actively driving the substrate 5 respectively by corresponding drive units (not shown).

The print head and in particular the individual ejection nozzles 4 are controlled by the controller in dependency of an intensity image (not shown). The intensity image comprises a two-dimensional pattern of different color intensities. The pattern consists of different pixels, wherein each pixel represents a certain position in the three-dimensional structure 2 to be printed. In particular, each pixel represents a certain position of a two-dimensional projection of the three-dimensional structure 2 onto the substrate 5. The intensity of the color in each pixel of the intensity image represents the height of the three-dimensional structure 2 at the corresponding position and therefore the number of droplets 6 to be deposited in this position by the corresponding ejection nozzles 4. The controller now controls the plurality of printing nozzles 4 in such a manner that the number of droplets 6 deposited in each position on the substrate 5 corresponds to the intensity of the intensity image after all depositing steps 10 have been subsequently performed. The three-dimensional structure 2 is thereby built up step by step until the amount of printing material deposited in each position correspond to the color intensity in the pixels of the intensity image. In this manner, the droplets 6 are deposited side by side and one above the other in order to generate the desired three-dimensional structure 2. As mentioned above, curing steps 11 are performed optionally between two subsequent depositing steps 10 in order to partially cure the deposited droplets 6 and to avoid that the deposited droplets 6 completely deliquesce after deposition.

In practice, the ejection characteristics of the ejection nozzles 4 are affected by clogging of printing ink and contamination with e.g. foreign particles and impurities. For this reasons, it happens from time to time that one or few ejection nozzles 4 of the print head 3 eject(s) less amount of printing ink in each depositing step 10. Ejection nozzles 4 with a suchlike ejection characteristic are hereinafter referred to as inaccurately working ejection nozzles 4'. The other ejection nozzles 4 are hereinafter referred to as accurately working ejection nozzles 4. As clogged ejection nozzles 4 sometimes becomes open again (declogging) and accurate working ejection nozzles 4 getting clogged due to unpredictable circumstances, the locations of the inaccurate working ejection nozzles 4' inside the print head 3 changes and cannot be determined or considered during printing.

The resulting deviations of the ejection characteristics between accurately working ejection nozzles 4 and inaccurately working ejection nozzles 4' in the same print head 3 lead to inequalities and non-uniformities in the printed three-dimensional structure 2. Usually, these inequalities and non-uniformities are so small that no visible and disturbing influences occur. However, in the present example, the three-dimensional structure 2 comprises an ophthalmic lens, wherein even the finest small inequalities and non-uniformities lead to serious optical defects disturbing the optical beam path when using the ophthalmic lens. In particular, these inequalities and non-uniformities generate unwanted diffractive phenomena.

In order to avoid these inequalities and non-uniformities in the printed three-dimensional structure 2, although the print head 3 comprises accurately working ejection nozzles 4 and inaccurately working ejection nozzles 4', a relative movement 9 between the print head 3 and the substrate 5 is accomplished in a moving step 12 always performed between two subsequent depositing steps 10. Consequently, the print head 3 and/or the substrate 5 is moved by the drive unit, even if a movement of the print head 3 relative to the substrate 5 between the depositing steps 10 is not required to build up the three-dimensional structure 2 due to the larger horizontal extension of the print head 1 compared to the horizontal extension of the three-dimensional structure 2 to be printed.

The relative movement 9 is only performed to ensure that all droplets 6 deposited in one single position on the substrate 5 or pixel of the three-dimensional structure 2 do not solely originates from one single ejection nozzle 4 because if this ejection nozzle 4 is an inaccurate working ejection nozzle 4', the above mentioned unwanted inequalities and non-uniformities occur at this position. The relative movement 9 provides that droplets 6 of inaccurately working ejection nozzles 4' are spread over an area of the three-dimensional structure 2 being as large as possible during the whole printing process, so that their negative influence on the lens quality is averaged out due to stochastical effects. After each depositing step 10, the print head 3 is moved for a moving distance X and along a moving direction φ parallel to the horizontal plane 7 of the substrate 5.

Preferably, the moving distance X and the moving direction φ of the relative movement 9 changes after each moving step 12 in order to avoid any regularity when distributing the droplets 6 of the inaccurately working ejection nozzle 4' over the entire three-dimensional structure 2. The relative movement 9 and particularly the moving distance X and the moving direction φ is randomly changed to achieve that droplets 6 ejected by the inaccurately working ejection nozzles 4' are almost evenly distributed over at least a section of the three-dimensional structure 2. In order to provide this random movement, the controller of the print head 3 comprises a random generator or a storage for storing a predefined moving scheme which is based on randomly generated parameters initially provided by a random generator at some previous moment, e.g. during designing or manufacturing of the printing system 1. The moving direction φ can be changed about any angle between 0 and 360 degrees between two sequencing moving steps 12. It is e.g. conceivable to turn the moving direction φ about 180 degrees, so that the print head is moved in opposite directions in two sequencing moving steps 12. The moving distance X can be smaller than a nozzle distance D between two adjacent ejection nozzles 4 during the moving step 12, e.g. one half of the nozzle distance D or one quarter of the nozzle distance D. The moving distance X can be changed in an interval between one quarter of the nozzle distance D to one nozzle distance D with steps of one quarter nozzle distance D. In this case, each location of the three-dimensional structure 2 obtains printing ink in a certain depositing step 10 originating from more than one ejection nozzle 4.

Preferred values of a changing moving direction φ between the two angles 0 and 180 degrees (plus and minus) and moving distance X in an interval between one quarter of the nozzle distance D to one nozzle distance D with steps of one quarter nozzle distance D is: $X_i=-D/2, -D/4, +D/4, +D/2$. It is conceivable that the moving distance X randomly switches between these four X-values.

In an alternative embodiment of the present invention explained with reference to FIG. 1, the movement of the print head 3 relative to the substrate 5 in the moving step 12 is realized in that the print head 3 vibrates with high frequency. In this case, the drive unit comprises a vibration generator continuously stimulating the vibration of the print head 3 to translational and/or rotational oscillations. In this way, also a random and not predefined movement of the print head 3 is achieved because the exact moving distance between to subsequent depositing steps 10 cannot be predicted due to the high frequency of the print head vibrations. In this embodiment, the moving steps and the depositing steps completely overlap in time with each other because the print head 3 is moved due to the stimulated vibrations also during depositing droplets 6 in the depositing step 10.

Figure 2:
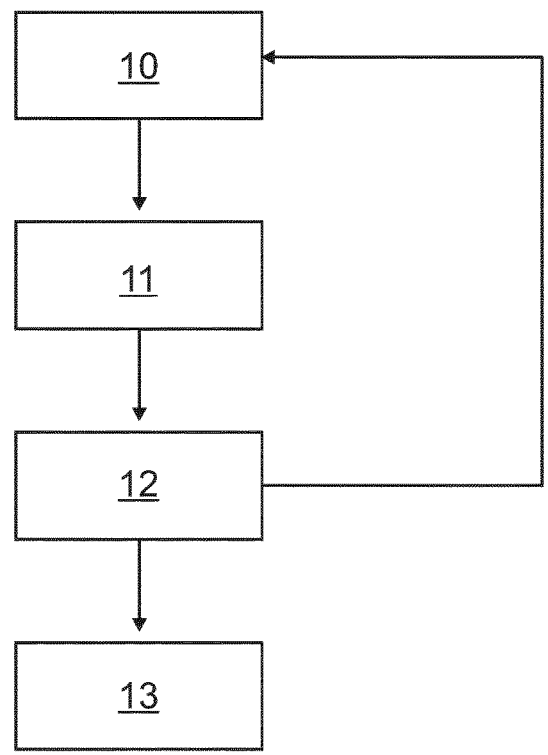
FIG. 2 illustrates different steps of the method according to the exemplary embodiment of the present invention.

In FIG. 2, different steps of the method according to the exemplary embodiment of the present invention explained with reference to FIG. 1 are shown. As described above, the method comprises the depositing step 10 of ejecting a plurality of droplets 6 simultaneously and in parallel towards the substrate 5, followed by an optional curing step 11 to at least partly curing printing ink of the deposited droplets 6 and a final moving step 12 for providing a relative movement 9 between the print head 3 and the substrate 5 in order to minimize the influence of inaccurately working ejection nozzles 4'. The depositing step 10, curing step 11 and the moving step 12 are repeated in order to build up the desired three-dimensional structure 2 step-by-step (also referred to as layer-by-layer) unit the desired three-dimensional structure 2 is finished. Finally, a final curing step 13 is performed optionally.

Figure 3:
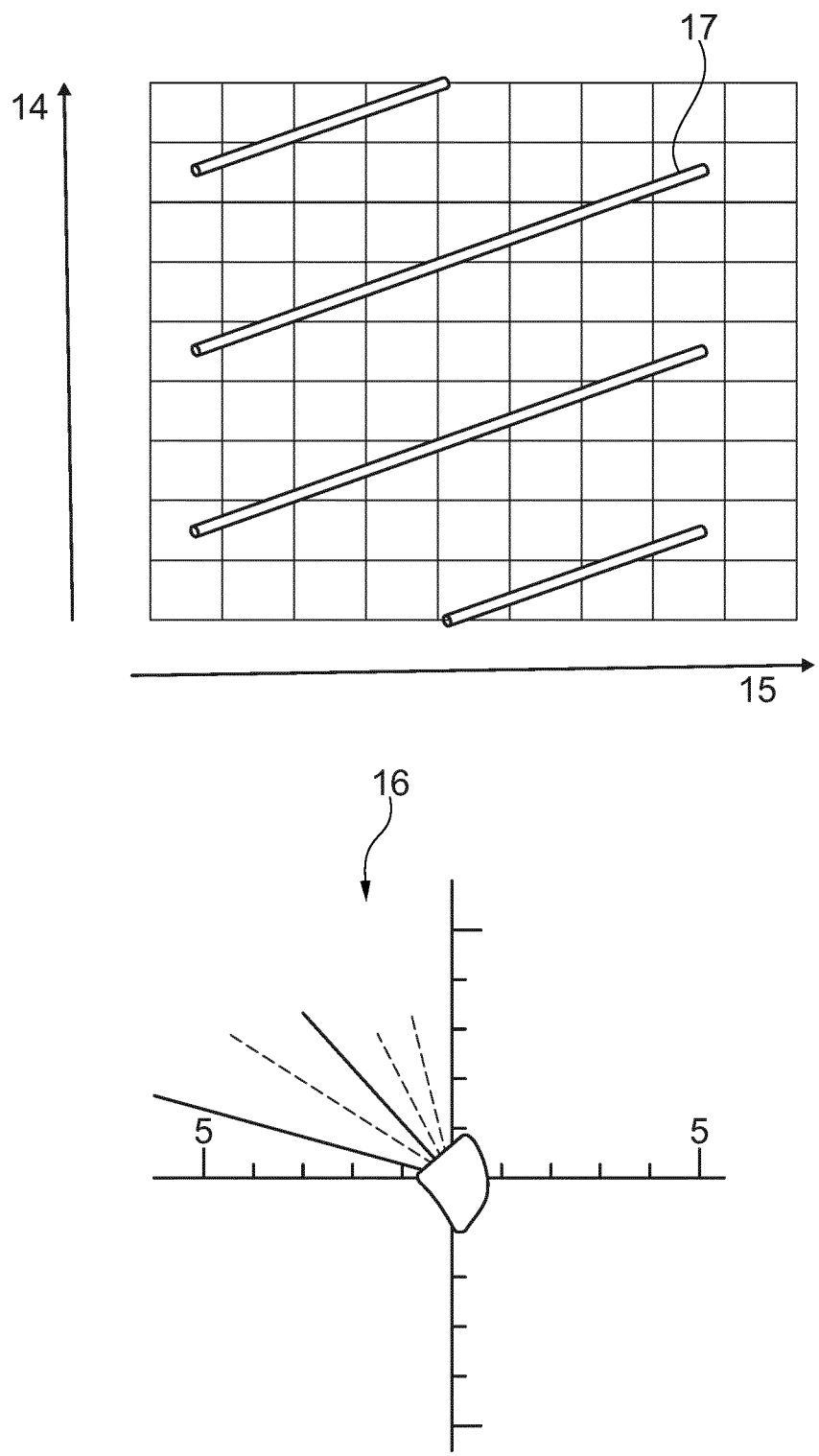
FIG. 3 illustrates schematically a method according to an exemplary embodiment of the present invention.

In FIG. 3 a printing method according to an exemplary embodiment of the present invention is illustrated. The printing method according to the present invention comprises depositing droplets 6 of printing ink side by side such that a three-dimensional structure 2 is built up layer by layer. The droplets of printing ink are deposited by a print head 3 comprising a number of ejection nozzles 4. The width spanned by the print head, i.e. the number of ejection nozzles 4 times the distance D between two adjacent ejection nozzles, exceeds the width of the three-dimensional structure 2 to be printed. The additional ejection nozzles 4, or only part of them, can advantageously be used during the printing process to compensate for potentially malfunctioning ejection nozzles 4'. More specifically, the printing scheme is set up such that the print head 3 is being moved between at least two depositing steps 10 in a moving step 12 such that the droplets 6 deposited in at least one position stem from two different ejection nozzles 4. Preferably, a moving scheme is determined at the beginning of the printing process. The moving scheme preferably comprises selecting a sequence of moving steps 12 and a number of compensating nozzles 4". The sequence of moving steps 12 comprises in particular a set of moving distances X with moving directions $\varphi$. E.g. the sequence of moving steps 12 can be written as $((X_1, \varphi_1), (X_2, \varphi_2), (X_3, \varphi_3), \ldots)$, where $X_1$ is the distance the print head 3 is moved relative to the deposited droplets in the direction $\varphi_1$ during the first moving step 12, $X_2$ is the distance the print head 3 is moved relative to the deposited droplets in the direction $\varphi_2$ during the second moving step 12, etc. Here, the moving distance is e.g. given in units of the distance D between two adjacent ejection nozzles 4 and the moving direction $\varphi$ as the polar angle measured from one corner of the print head 3. In a preferred embodiment, the moving direction $\varphi$ is the same for all moving steps, e.g. 0°, i.e. perpendicular to the printing direction. The moving direction may take on either of the two values 0° and 180°, i.e. the moving back and forth perpendicular to the printing direction. Preferably, the moving distance X is an integer multiple of the distance D between two adjacent ejection nozzles 4. In an alternative preferred embodiment, the moving distance X is smaller than the distance D. E.g. the moving distance may be one half or one quarter of the distance D between two adjacent ejection nozzles 4. A moving step 12 may be carried out after each depositing step 10. Alternatively, it is conceivable that a moving step 12 is carried out after every other depositing step 10 or in any other interval. Optionally, curing steps 11 are carried out after at least one depositing step 10. It is conceivable that a curing step 11 is carried out after each depositing step 10. The number of compensation nozzles 4" may be kept fixed during the entire printing process or may vary after any desired and beneficial number of moving steps 12. E.g. the number of compensation nozzles 4" may vary depending on the width of the three-dimensional structure 2: with decreasing width of the three-dimensional structure the number of compensation nozzles 4" may be increased. For a convex optical component, for example, the width decreases with increasing height of the structure. In this case, the number of compensation nozzles 4" can be advantageously increased with the number of layers printed. In this way, the likelihood of using malfunctioning ejection nozzles 4' is further decreased. In a preferred embodiment, the number of ejection nozzles 4 that can be used as compensating nozzles 4" is large enough to use a section of function ejection nozzles 4 for the printing of the small-width layers of the three-dimensional structure 2 to be printed. The upper part of FIG. 3 illustrates a moving scheme according to a preferred embodiment of the present invention. On the y-axis the number of layers 14 is being depicted. The width of the three-dimensional structure 2 in units of the distance D between adjacent ejection nozzles 4, i.e. in number of pixels 15, is plotted on the x-axis. In the exemplary moving scheme illustrated here, it is assumed that the print head 3 comprises a single malfunctioning ejection nozzle 4'. The number of malfunctioning ejection nozzles 4' is assumed to remain constant over the printing process for the sake of simplicity and ease of illustration. The defect 17 caused by the malfunctioning ejection nozzle 4' is shown as a point in the diagram. The defect 17 comprises a droplet of reduced volume, a missing droplet or any other defect caused by a malfunctioning ejection nozzle 4' such as a clogged or partially clogged ejection nozzle. As can be seen from the diagram, the moving scheme consists of a sequence of moving steps 12. During each moving step, the print head 3 is moved in a moving direction $\varphi$ perpendicular to the printing direction 3 relative to the deposited droplets 6. It is insignificant whether the relative movement consists in a movement of the print head 3 or a movement of the printing plate on which the droplets 6 are being deposited, as only the relative movement is of significance here. The print head 3 is moved by a moving distance X, which in this example is an integer multiple of the distance D, i.e. the moving distance X is larger than D. The moving distance X is kept constant for a fixed number of moving steps 12. In particular, the moving distance X remains the same until the number of compensating nozzles 4" has moved over the entire width of the three-dimensional structure 2. The next moving step 12 moves the print head 3 to the starting position and the series of moving steps 12 is repeated. As can be seen from the diagram, in this way, the defect 17 caused by the single malfunctioning ejection nozzle 4' is propagated across the full width of the three-dimensional structure 2. In this way, a certain degree of averaging is achieved. Whereas such a moving scheme is sufficient to average out volumetric differences caused by malfunctioning ejection nozzles 4', it is insufficient to average out optical defects caused by malfunctioning ejection nozzles 4'. In particular, the defects 17 form lines in the three-dimensional structure 2 which act as interference grid for light passing through the structure 2. The slope of these lines depends on the moving distance X. A moving distance X larger than the distance D results in a slope below 45°, a moving distance X smaller than the distance D, as achieved through microstepping, results in a slope larger than 45°. Hence, through the choice of moving distance, the form of the interference grid and hence the resulting interference pattern is determined. Preferably, the moving distance X is chosen such that the interference pattern occurs in non-functional regions of the three-dimensional structure 2 or is moved to angles that are invisible for a potential user of the three-dimensional structure 2. A corresponding interference pattern is depicted in the lower part of FIG. 3. The lower part of FIG. 3 depicts the interference pattern caused by a single laser beam passing through an optical structure 2 printed with the moving scheme defined above. As the slit width varies with the viewing angle, i.e. with the incident angle of the laser light, the interference pattern depends on the viewing angle as well. The corresponding three-dimensional structure 2 exhibits defects in the form of blurry bands that vary with the viewing angle. Thus, even though a certain improvement in accuracy is achieved, it is insufficient for most optical applications, i.e. in cases that the three-dimensional structure 2 to be printed comprises an optical component of higher accuracy.

Figure 4:
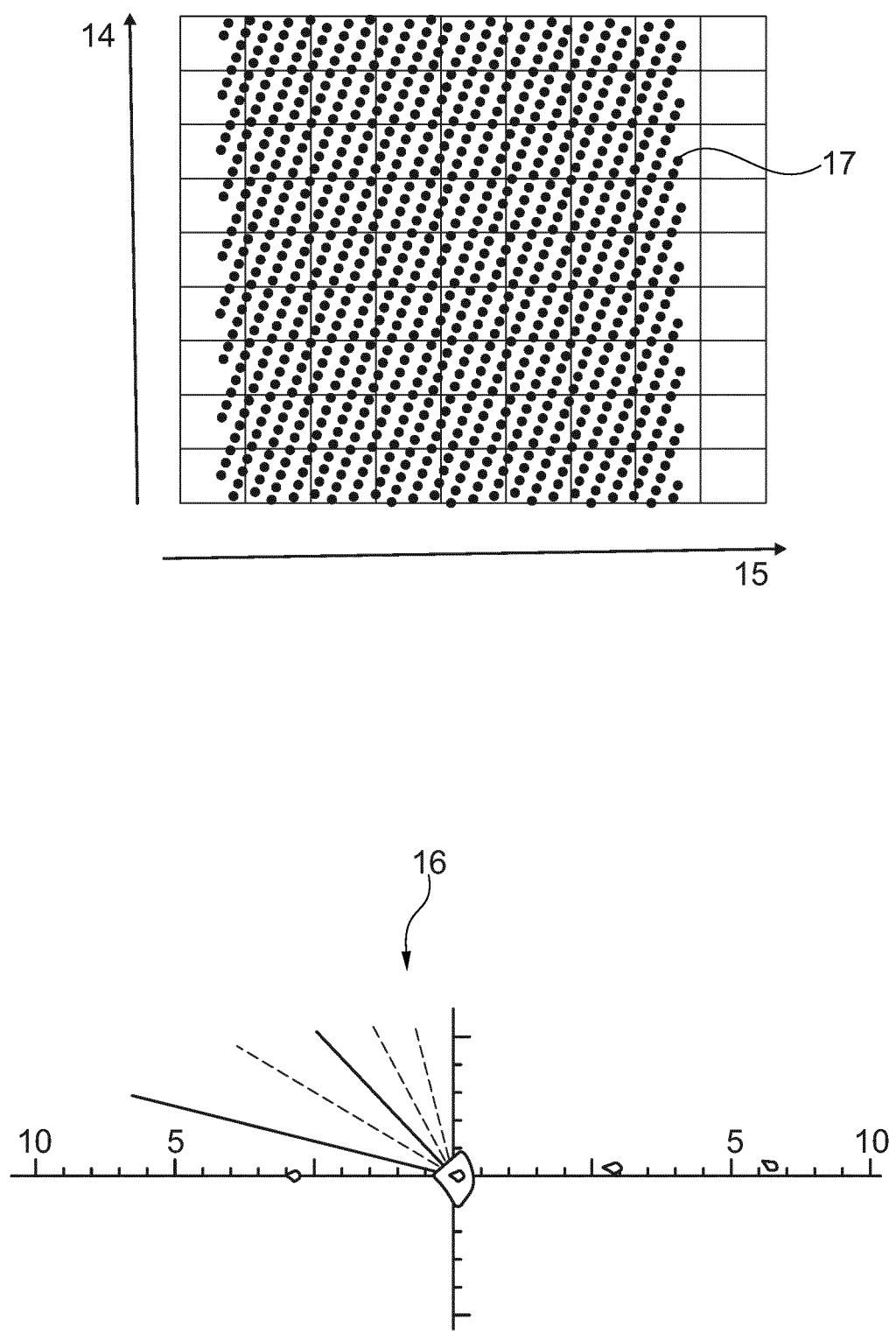
FIG. 4 illustrates schematically a method according to an alternative exemplary embodiment of the present invention.

In FIG. 4 a printing method according to an alternative exemplary embodiment of the present invention is illustrated. The exemplary embodiment illustrated in FIG. 4 differs from the exemplary embodiment illustrated in FIG. 3 in the moving scheme and hence in the achieved accuracy of the printed three-dimensional structure 2. The moving scheme is again illustrated in the upper part of the FIG. 4. The diagram plots the number of layers 14 over the width in number of pixels 15 of the three-dimensional structure 2. Again, it is assumed that the number of malfunctioning nozzles 4' remains constant over the printing process and that only a single ejection nozzle 4 is malfunctioning. This is for illustrative purposes only. In this exemplary embodiment, the moving scheme comprises a moving direction φ perpendicular to the printing direction for all moving steps 12. The moving distance X, however, is no longer constant, but varies according to a predefined scheme. The scheme is selected such that the defects 17 caused by the malfunctioning ejection nozzle 4' is most favorably distributed over the three-dimensional structure 2. Preferably, the defects 17 are distributed as uniformly as possible over the three-dimensional 2. One way of achieving such a distribution is by selecting step sub-sequences for each layer. E.g. the first layer may have ten possible step locations, the second layer may have eleven possible step locations, the third layer may have twelve possible step locations etc. From the set of step locations obtained from combining all step sub-sequences a set of all possible step locations is obtained. The set is chosen such that each location is unique and never repeats. Preferably, the steps contained in this set are shuffled randomly, e.g. through a random generator, yielding the step sequence. In particular, the randomization is carried out under certain constraints, e.g. a minimal step size and/or a maximal randomization position, in particular for the first few layers. In this way, patterns and accumulation of defects are advantageously avoided. This reduces in particular the extent of optical effects caused by the defects 17, e.g. defect lines are advantageously avoided. In particular, the interference pattern caused by the defects 17 is improved as compared to the interference pattern caused by the moving scheme according to the exemplary embodiment of FIG. 3. This can be deduced from the lower part of FIG. 4. The lower part of FIG. 4 shows the interference pattern caused by a single beam of laser light passing through a three-dimensional structure 2 at a fixed angle. The visibility and orientation dependence of the defects 17 is significantly reduced.

REFERENCE SIGNS

1 Printing system
2 Three-dimensional optical structure
3 Print head
4 Ejection nozzle
4' Malfunctioning or inaccurately working nozzle
4" Compensating nozzle
5 Substrate
6 Droplet
7 Horizontal plane
8 LED
9 Relative movement
10 Depositing step
11 Curing step
12 Moving step
13 Final curing step
14 Number of layers
15 Number of pixels
16 Interference pattern
17 Defect X Moving distance
D Distance between two adjacent ejection nozzles
φ Moving direction

The invention claimed is:

1. A method for printing a three-dimensional structure, the method comprising:
depositing droplets of a printing ink side by side and one above another in a plurality of consecutive depositing steps by means of a print head, the print head comprising a plurality of ejection nozzles,
wherein in each of the depositing steps, a plurality of the droplets are ejected simultaneously by the plurality of the ejection nozzles,
wherein the method comprises a moving step, where the print head is moved relative to the deposited droplets, the moving step is performed between at least two consecutive of the depositing steps such that the droplets deposited in a same position in the at least two consecutive depositing steps are ejected at least partly from two different ejection nozzles such that all droplets deposited in the same position do not solely originate from one single ejection nozzle,
wherein the print head is moved relative to the deposited droplets according to a predefined moving scheme,
wherein the predefined moving scheme is determined prior to the printing depending on a geometry of the three-dimensional structure and depending on dimensions of the print head, and
wherein the method is conducted without detecting a clog in a nozzle or stopping the print.

2. The method according to claim 1, wherein the predefined moving scheme is determined prior to the printing depending on an accuracy required of the three-dimensional structure.

3. The method according to claim 1, wherein predefining the predefined moving scheme comprises choosing a compensation set of compensating nozzles and choosing a step sequence of moving distances and moving directions by which the print head is moved relative to the deposited droplets during a sequence of moving steps.

4. The method according to claim 3, wherein a number of the compensating nozzles in the compensation set is chosen depending on a number of layers to be printed.

5. The method according to claim 3, wherein a number of compensating nozzles used in the depositing step is chosen depending on a width of a layer to be printed.

6. The method according to claim 3, wherein a number of the compensating nozzles differs for at least two of the depositing steps.

7. The method according to claim 3, wherein the step sequence is chosen such that each of the compensating nozzles deposits the droplets at each position at most once.

8. The method according to claim 3, wherein a sub-sequence step is defined for each layer such that every position occurs only once in the step sequence comprising all step sub-sequences and all steps in the step sequence are randomly shuffled using a random generator.

9. The method according to claim 3, wherein a moving distance and/or a moving direction differs during at least two of the moving steps.

10. The method according to claim 3, wherein the print head is moved relative to the deposited droplets during at least one of the moving steps for a moving distance being smaller than a nozzle distance between two adjacent ejection nozzles during the moving step.

11. A method for printing a three-dimensional structure comprising:

depositing droplets of printing ink side by side and one above an other in a plurality of consecutive depositing steps by means of a print head, the print head comprising a plurality of ejection nozzles, wherein in each of the depositing steps, a plurality of the droplets are ejected simultaneously by the plurality of the ejection nozzles of the print head, wherein the print head is moved relative to the deposited droplets in a moving step performed between at least two consecutive depositing steps in such a manner that at least part of the droplets deposited in a same position in at least two consecutive depositing steps are ejected from two different ejection nozzles, wherein the movement of the print head relative to the deposited droplets in the moving step is realized in that the print head and/or the substrate vibrates, and wherein the method is conducted without detecting a clog in a nozzle or stopping the print.

12. The method of claim 11, wherein the three-dimensional structure is an optical component.

13. The method of claim 1, wherein a first ejection nozzle deposits at a first pixel, and during the moving step, the print head is moved such that a second ejection nozzle deposits at the first pixel, without detecting a clog or malfunction or stopping the print.

14. The method of claim 1, wherein the three-dimensional structure is an optical component.

\* \* \* \* \*